(12) United States Patent
Oyama

(10) Patent No.: US 7,695,662 B2
(45) Date of Patent: Apr. 13, 2010

(54) METHOD FOR PRODUCING RESIN STRUCTURE

(75) Inventor: Hiroyuki Oyama, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/261,126

(22) Filed: Oct. 30, 2008

(65) Prior Publication Data
US 2009/0115089 A1 May 7, 2009

(30) Foreign Application Priority Data
Oct. 31, 2007 (JP) .............................. P2007-284269

(51) Int. Cl.
B29C 47/76 (2006.01)
B29C 70/44 (2006.01)
B29C 45/14 (2006.01)
B29C 47/00 (2006.01)
B32B 3/00 (2006.01)

(52) U.S. Cl. ........................ 264/258; 264/248; 264/257; 264/313; 264/314; 264/512; 264/516; 264/553; 264/571; 264/574; 264/DIG. 50; 156/197; 156/245; 156/285; 156/289; 428/542.6

(58) Field of Classification Search ................. 264/101, 264/258; 156/197; 428/542.6
See application file for complete search history.

(56) References Cited

U.S. PATENT DOCUMENTS 3,046,684 A * 7/1962 Tritt .............................. 428/12
5,242,651 A * 9/1993 Brayden et al. ............. 264/510

FOREIGN PATENT DOCUMENTS

| JP | 10-193484 | 7/1998 |
| JP | 3690744 | 6/2005 |
| JP | 2008-168489 | 7/2006 |

* cited by examiner

Primary Examiner—Matthew J. Daniels
Assistant Examiner—Atul Khare
(74) Attorney, Agent, or Firm—Finnegan, Henderson, Farabow, Garrett & Dunner, LLP

(57) ABSTRACT

A macrocell structure 20 having a honeycomb form is preheated to cure to a cure depth falling within a range where a flexibility of prepregs in the macrocell structure remains. Subsequently, prepregs 31, 32 are arranged along a side wall of the preheated macrocell structure 20, so as to make a preliminary structure 40. Then, the preliminary structure 40 is heated while the inside of the prepregs 31, 32 in the preliminary structure 40 is vacuumed. Thereafter, the preliminary structure 40 is heated while imparting an internal pressure thereto within a mold 5, so as to be cured, whereby a resin structure 1 is produced.

3 Claims, 15 Drawing Sheets

(a)

(b)

METHOD FOR PRODUCING RESIN STRUCTURE

BACKGROUND OF THE INVENTION

1. Field of the Invention

The present invention relates to a method for producing a resin structure.

2. Related Background Art

As a resin structure, one having a hollow part formed therewithin has conventionally been known. An example of methods for producing this kind of resin structure is one disclosed in Patent Document 1. This method comprises overlaying a prepreg on an inner face of a mold, placing a bag adapted to inflate when filled with pressurized air on the inside of thus obtained prepreg laminate, and heating to cure the prepreg laminate while pressing it against the inner face of the mold by inflating the bag (Patent Document 1: Japanese Patent Publication No. 3690744).

SUMMARY OF THE INVENTION

Also known as this kind of resin structure is one using the resin structure disclosed in the above-mentioned Patent Document 1 as an outer shell resin layer, while forming an inner resin layer in a hollow part formed on the inside of the outer shell resin layer. For producing a resin structure having such an inner resin layer, the method disclosed in the above-mentioned Patent Document 1 can shape the inner resin layer by pressing it against the outer shell resin layer with the bag when the outer face of the inner resin layer opposes an inner side face of the outer shell resin layer. In the case where the inner resin layer has a complicated form such as a honeycomb form so that a side wall of the inner resin layer opposes the inner side face of the outer shell resin layer, however, the inner resin layer cannot be pressed against the outer shell resin layer even when the bag is used. This has been problematic in that the inner resin layer is hard to shape, while it is difficult for the inner resin layer and the outer shell resin layer to come into close contact with each other.

It is therefore an object of the present invention to provide a method for producing a resin structure which can easily shape a hollow structure even when it has a complicated inner form such as a honeycomb form, and can bring an inner resin layer and an outer shell resin layer into close contact with each other.

For integrally curing an inner preform, constructed by stacking a plurality of prepregs, having a side wall part with an outer shell resin member, arranged along a side wall in the inner preform, constituting a part of a wall face of a resin hollow structure, the method for producing a resin structure in accordance with the present invention, which has overcome the above-mentioned problem, comprises: a preliminary heat curing step of preheating to cure the inner preform to a cure depth falling within a range where a flexibility of the prepreg constituting the inner preform remains; a preliminary structure making step of arranging an outer shell resin matrix to become the outer shell resin member along the side wall of the inner preform preheated by the preliminary heating step, so as to make a preliminary structure comprising the inner preform and outer shell resin matrix; a vacuum suction heating step of heating the preliminary structure made by the preliminary heating step while vacuuming the inside of the outer shell resin matrix in the preliminary structure; and a main heat curing step of heating the preliminary structure while imparting an internal pressure thereto within a mold after the vacuum suction heating step, so as to cure the preliminary structure.

The method for producing a resin structure in accordance with the present invention arranges an outer shell resin matrix to become an outer shell resin member along a side wall of an inner preform, so as to make a preliminary structure, heats the preliminary structure while vacuuming the inside thereof, and then finally heats the preliminary structure while imparting an internal pressure thereto, so as to produce the resin structure. Therefore, unlike the case using a bag or the like, the inner preform arranged on the inside can be shaped easily even when it has a complicated form. Since vacuum suction is carried out in the process of heating the preliminary structure, the outer shell resin member matrix can be brought into close contact with the inner preform even when the latter has a complicated form.

In the present invention, "preform" refers to a form into which a prepreg or a laminate made of prepregs has been shaped or assembled beforehand. On the other hand, "prepreg" refers to a shaping intermediate material in which a cloth having a fine texture made of reinforced fibers is impregnated with a thermosetting resin. Examples of the reinforced fibers for the prepreg include inorganic fibers such as carbon fibers, glass fibers, and aramid fibers and various metal fibers. Examples of the thermosetting resin include epoxy resins, vinylester resins, silicone resins, and polyimide resins. From the viewpoint of controlling the cure depth of the resin by heating, however, resins other than the polyester resins are preferably used.

The preliminary structure making step may attach a completely cured resin tube to the inner preform, so as to make the preliminary structure in a state where the outside and inside of the preliminary structure communicate with each other, while the main heat curing step may impart the internal pressure to the preliminary structure through the resin tube.

When the completely cured resin tube is attached to the inner preform, and the internal pressure is imparted to the preliminary structure through the resin tube as such, the internal pressure can easily be imparted to the preliminary structure.

The inner preform may have a honeycomb form constructed by stacking a plurality of prepregs, linearly bonding prepregs located adjacent to each other in the plurality of overlapping prepreg layers to each other at a predetermined interval, and unfolding the plurality of prepregs.

Even when the inner preform having a honeycomb form is used as such, the outer shell resin member matrix can reliably be brought into close contact with the inner preform. Here, linearly bonding prepregs located adjacent to each other in the stacking direction in a plurality of overlapping prepreg layers to each other at a predetermined interval and unfolding the plurality of prepregs can easily make the inner preform having a honeycomb form.

The main heat curing step may impart the internal pressure to a plurality of spaces formed by the inner preform and outer shell resin member through a communication hole communicating the spaces with each other.

When the internal pressure is imparted to a plurality of spaces formed by the inner preform and outer shell resin member through a communication hole communicating the spaces with each other as such, the inner preform can be kept from being deformed by the internal pressure.

The method for producing a resin structure in accordance with the present invention can easily shape a hollow structure even when it has a complicated inner form such as a honeycomb form, and can bring an inner resin layer and an outer shell resin layer into close contact with each other.

DESCRIPTION OF THE PREFERRED EMBODIMENTS

Figure 1:
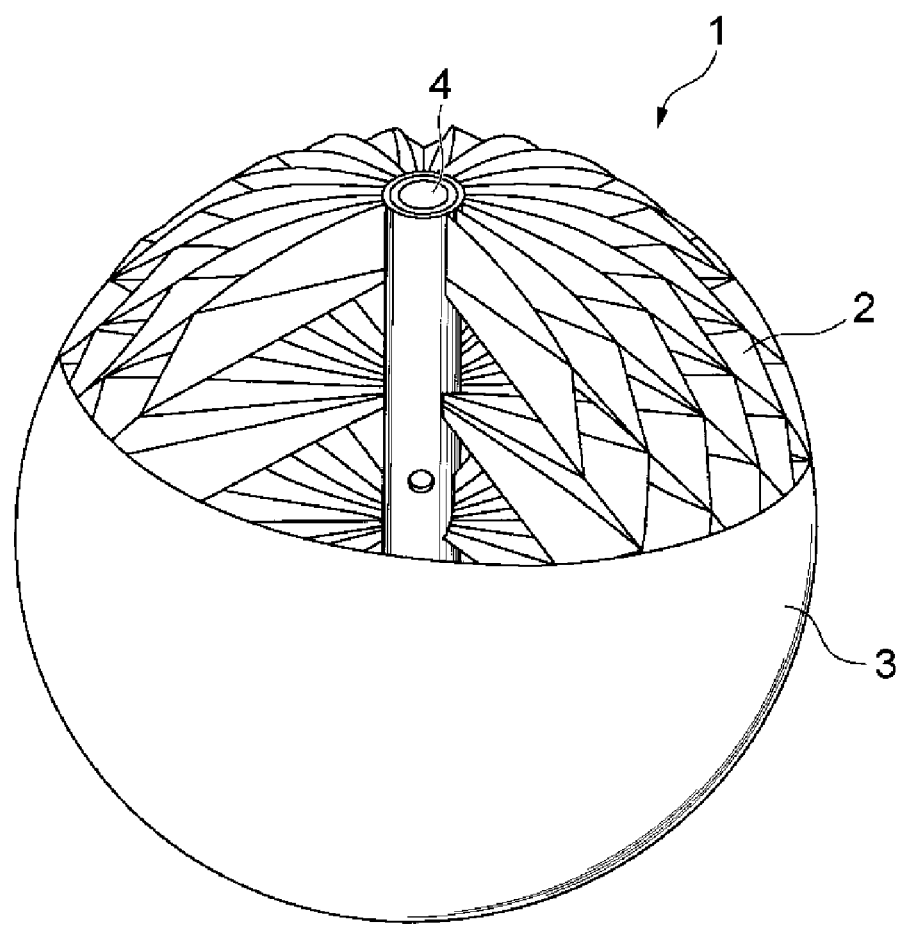
FIG. 1 is a partly broken perspective view of a resin structure produced by the method in accordance with an embodiment of the present invention.

In the following, embodiments of the present invention will be explained with reference to the accompanying drawings. In the explanation of the drawings, the same constituents will be referred to with the same numerals or letters while omitting their overlapping descriptions. For convenience of illustration, ratios of sizes in the drawings do not always coincide with those explained.

FIG. 1 is a partly broken perspective view of a resin structure produced by the method in accordance with an embodiment of the present invention. The resin structure 1 in accordance with this embodiment shown in FIG. 1 is a hollow structure made of FRP (Fiber Reinforced Plastics). As shown in FIG. 1, the resin structure 1 includes an inner structure 2 to become an inner preform, while an outer shell structure 3 is provided about the inner structure 2. The inner structure 2 is shaped like a sphere as a whole, while partly having a honeycomb form. A center tube 4, which is a resin tube, is placed such as to penetrate through the center of the spherical form of the inner structure 2.

Figure 2:
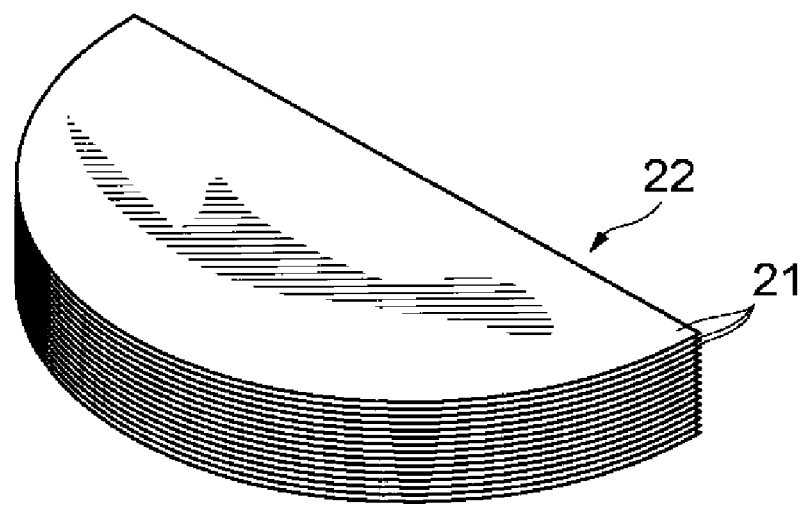
FIG. 2 is a perspective view showing a prepreg laminate.

A method for producing the resin structure 1 will now be explained. First, when producing the resin structure 1, a macrocell structure 20, shown in FIG. 5, to become the inner structure 2 after being cured is made. The macrocell structure 20 becomes the inner preform of the present invention. For making the macrocell structure 20, a plurality of (20 in this embodiment) prepregs 21, which have been cut into the same semicircular form, are prepared and stacked into a prepreg laminate 22 as shown in FIG. 2.

Here, each of the prepregs 21 may be one using carbon fibers, aramid fibers, glass fibers, and the like as its base material. Examples of resins compounded in the prepreg 21 include thermosetting epoxy resins and vinylester resins.

The fiber orientation in the prepreg 21 is appropriately set according to a value estimated as a load of the resin structure 1. When shear deformation is expected, for example, the fiber orientation in the prepreg 21 is set to ±90° with respect to an axis orthogonal to the linear part of the prepreg 21. When compressive/tensile deformation or bending deformation is expected, the fiber orientation in the prepreg 21 is set to ±45° with respect to the axis orthogonal to the linear part of the prepreg 21.

Figure 3:
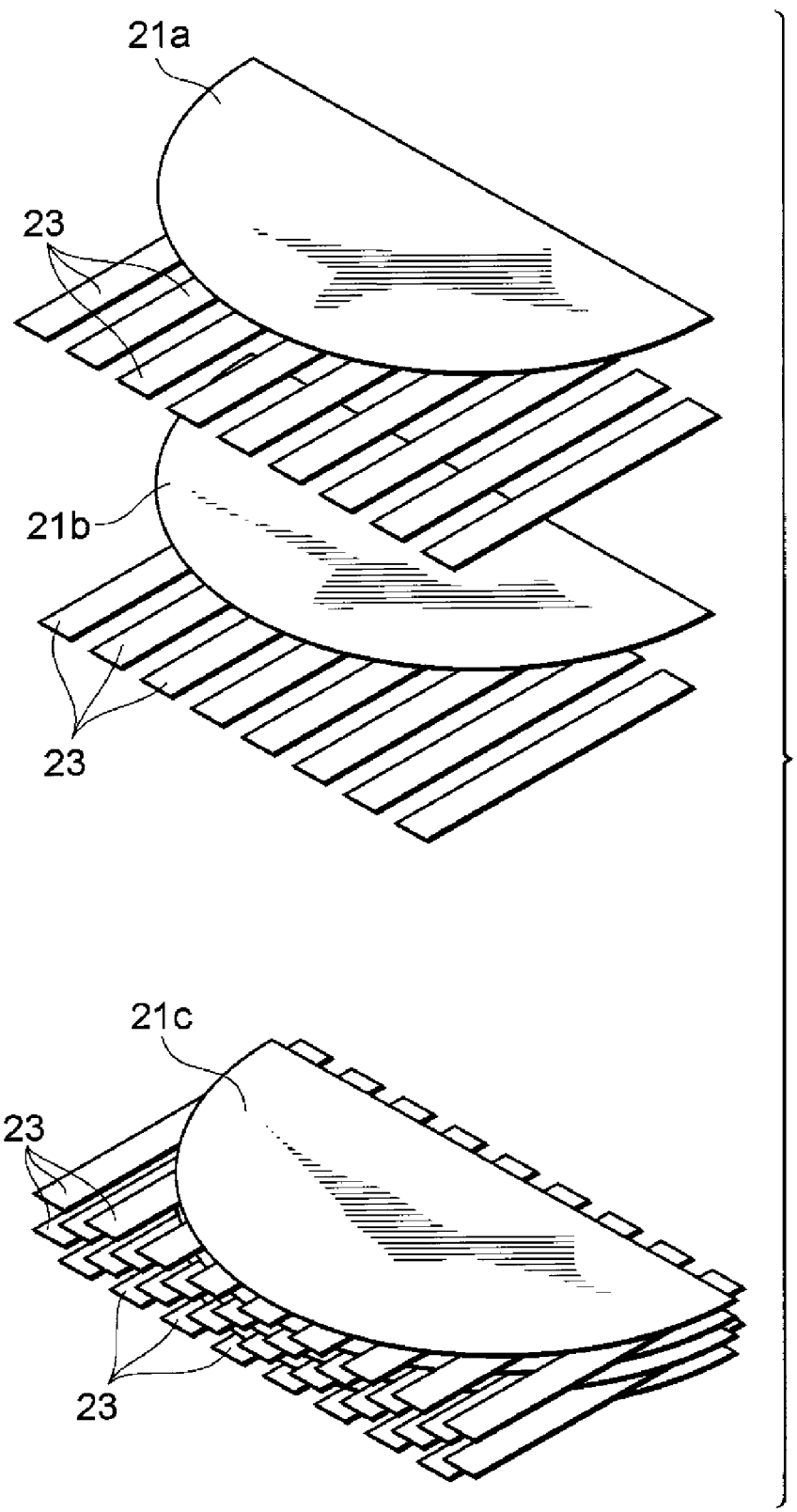
FIG. 3 is an exploded perspective view for explaining a state where Teflon films are held in the prepreg laminate.
Figure 4:
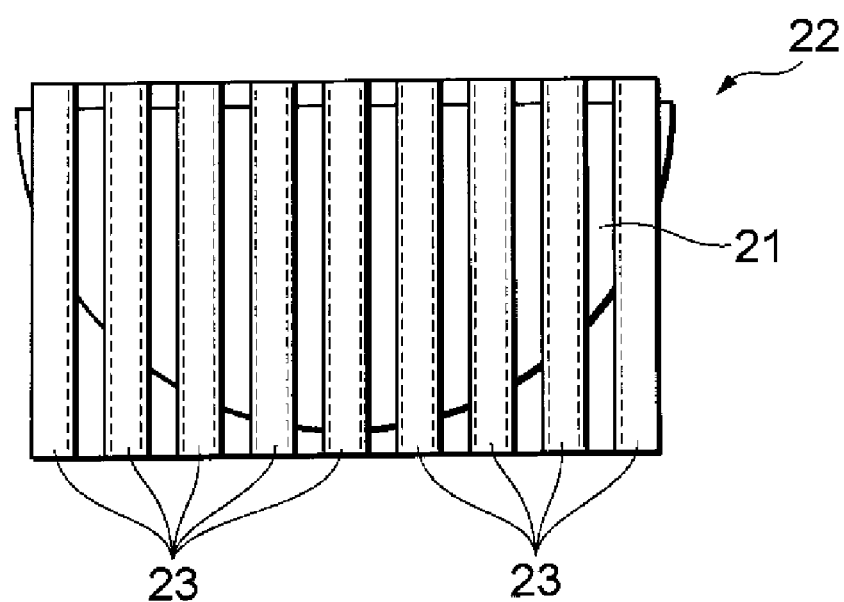
FIG. 4 is a plan view for explaining the state where the Teflon films are held in the prepreg laminate.

Next, as shown in FIGS. 3 and 4, a plurality of films 23 made of polytetrafluoroethylene (hereinafter referred to as Teflon (registered trademark)) as mold-releasing members cut into strips are arranged between the plurality of prepregs 21. Each of the Teflon films 23 has a width of 20 mm. Between the first- and second-layer prepregs 21$a$, 21$b$, a plurality of Teflon films 23 are arranged at predetermined intervals (of about 3 mm in this embodiment) as indicated by solid lines in FIG. 4. The predetermined interval may be 1 to 5 mm here, for example.

Between the second- and third-layer prepregs 21$b$, 21$c$, Teflon films 23 are arranged at respective positions shifted by ½ (10 mm) of the width of each Teflon film 23 from the positions where the Teflon films 23 are arranged between the first- and second-layer prepregs 21$a$, 21$b$ when seen in the stacking direction of the prepreg laminate 22. This yields a state where the Teflon films 23 are arranged at predetermined intervals (of about 3 mm in this embodiment) as indicated by broken lines in FIG. 4 so as to fill the gaps between the Teflon films 23 arranged between the first- and second-layer prepregs 21$a$, 21$b$. The predetermined interval may also be 1 to 5 mm here, for example.

Subsequently, a plurality of Teflon films 23 are arranged at predetermined intervals between the (n−1)th- and nth-layer prepregs 21, 21 in the same manner. Between the nth- and (n+1)th-layer prepregs 21, 21, Teflon films 23 are arranged at predetermined intervals so as to fill the gaps between the Teflon films 23 arranged between the (n−1)th- and nth-layer prepregs 21, 21. A dielectric characteristic sensor (IDEX sensor) which is not depicted is buried in a surface of the prepregs 21.

After thus arranging the Teflon films 23 between a plurality of prepregs 21 in the prepreg laminate 22, a preliminary heat curing step is started. In the preliminary heat curing step, the prepreg laminate 22 is preheated to a cure depth within a range where a flexibility of the prepregs 21 remains. In the preheating, the prepreg laminate 22 is covered with a nylon bag or the like and heated to a temperature of 110° C. while being vacuumed, so that the resin component in the prepregs 21 is cured to a cure depth of 20%. The cure depth of the prepregs 21 is verified by monitoring it in real time according to a dielectric characteristic detected by the IDEX sensor. Here, the heating temperature can fall within the range of 90° C. to 110° C. The cure depth can be on the order of 20% to 30%.

Here, at positions where no Teflon films 23 are provided, the prepregs 21 located in a vertical row are bonded to each other and solidified. On the other hand, the Teflon films 23 have such a favorable releasability that no bonding takes place at positions where the Teflon films 23 are held between the prepregs 21. Thus, the prepregs 21 located adjacent to each other in the stacking direction in overlapping layers of a plurality of prepregs 21 are linearly bonded to each other at predetermined intervals. When the cure depth is held at 20% to 30%, the prepregs 21 are soft at a high temperature of 60° C. to 80° C., whereby the prepreg laminate 22 can sufficiently be unfolded.

Figure 5:
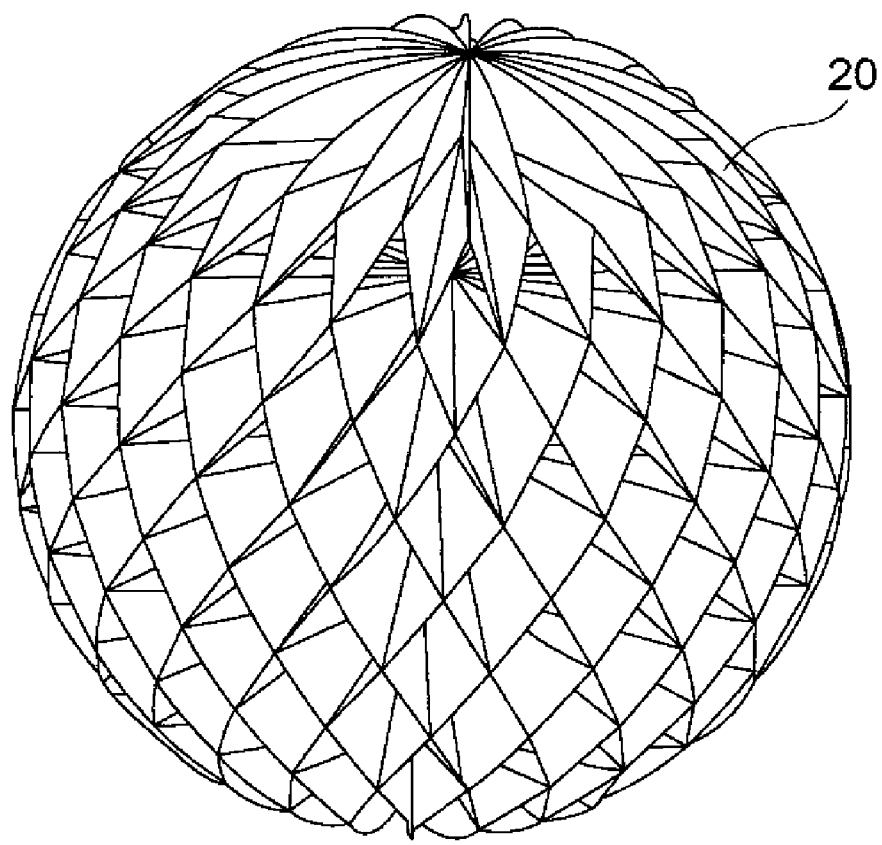
FIG. 5 is a perspective view of a macrocell structure.

Immediately thereafter, before the temperature of the prepreg laminate 22 drops, specifically when the temperature is 60° C. or higher, the nylon bag is removed, and the prepreg laminate 22 is unfolded while rotating each of the plurality of prepregs 21 about the linear part of each prepreg 21 and cooled as it is. Cooling the prepreg laminate 22 in an unfolded state can yield the macrocell structure 20 having a honeycomb form in which a plurality of cells are formed as shown in FIG. 5. When the prepreg laminate 22 lowers its temperature so much that the unfolding is difficult, the prepreg laminate 22 may be reheated, e.g., to 80° C., and then unfolded. The cells in thus obtained macrocell structure 20 have the same capacity.

While the macrocell structure 20 is thus produced, the center tube 4 to be inserted into the macrocell structure 20 is made. The center tube 4 is equipped with a completely cured tube made of FRP. The center tube 4 has a cylindrical form provided with a hollow hole, while its barrel defining the side wall is formed with one communication hole 4a communicating the hollow part and the outside with each other. The communication hole 4a has a diameter of about 1 mm.

For making the center tube 4, three plies of prepregs are wound about an aluminum rod having a diameter of about 10 mm in ±45° C. directions with respect to the axial direction of the aluminum rod. Subsequently, the prepregs are covered with a nylon bag and heated in a curing furnace at 90° C. for 1 hr and then at 130° C. for 1.5 hr under vacuum suction, so as to be cured. Thereafter, the resin formed by completely curing the prepregs is pulled out of the aluminum rod. This completely cured resin becomes the center tube 4. Further, a hole having a diameter of 1 mm is drilled in the barrel of the center tube 4, so as to form the communication hole 4a.

Two to three plies of prepregs 31 are wound about the center tube 4. Here, the prepregs 31 are wound in ±45° directions with respect to the axial direction of the center tube 4. The barrel of the center tube 4 has been provided with the communication hole 4a beforehand. After winding the prepregs, a communication hole similar to that provided in the barrel of the center tube is formed at a position corresponding thereto. Thus, the center tube 4 is made.

Figure 6:
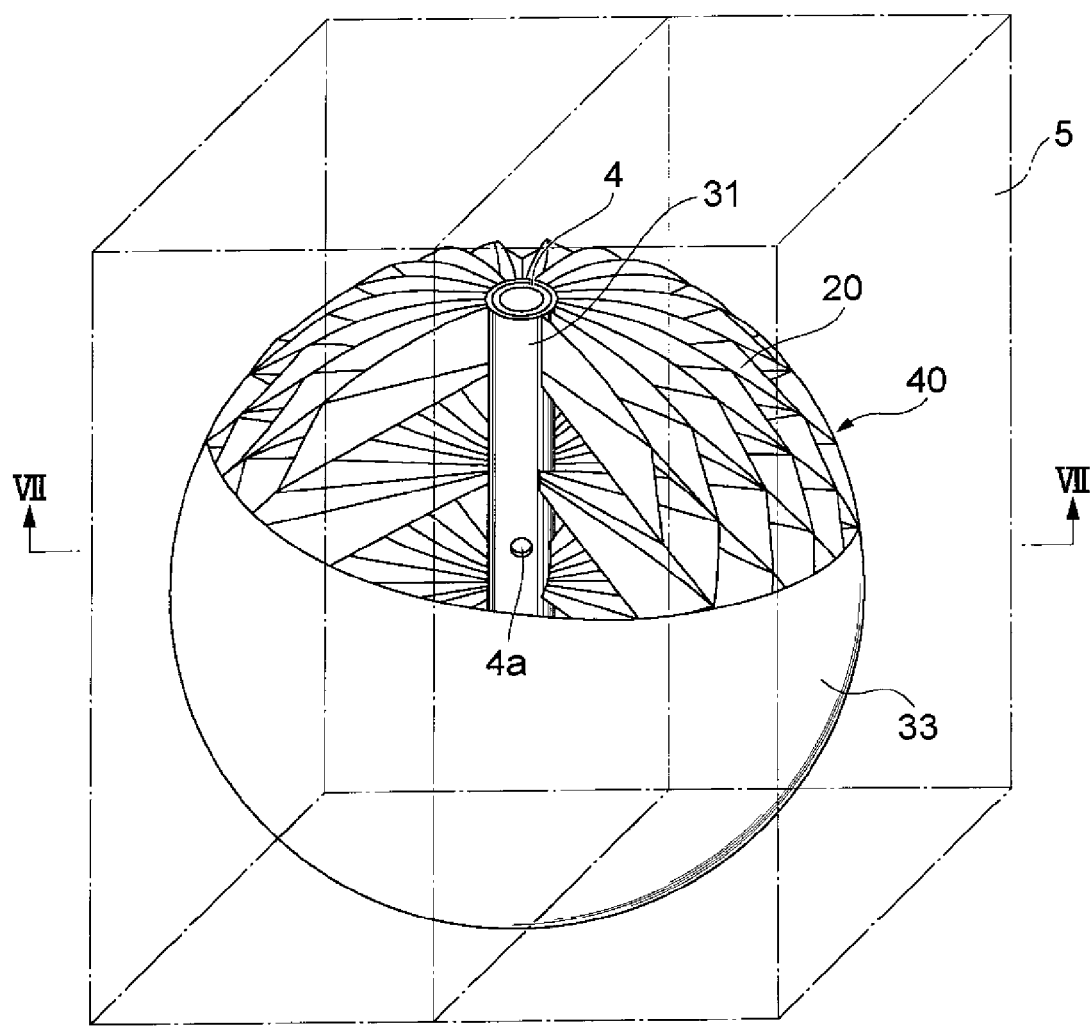
FIG. 6 is a perspective view of a state before curing the resin structure.
Figure 7:
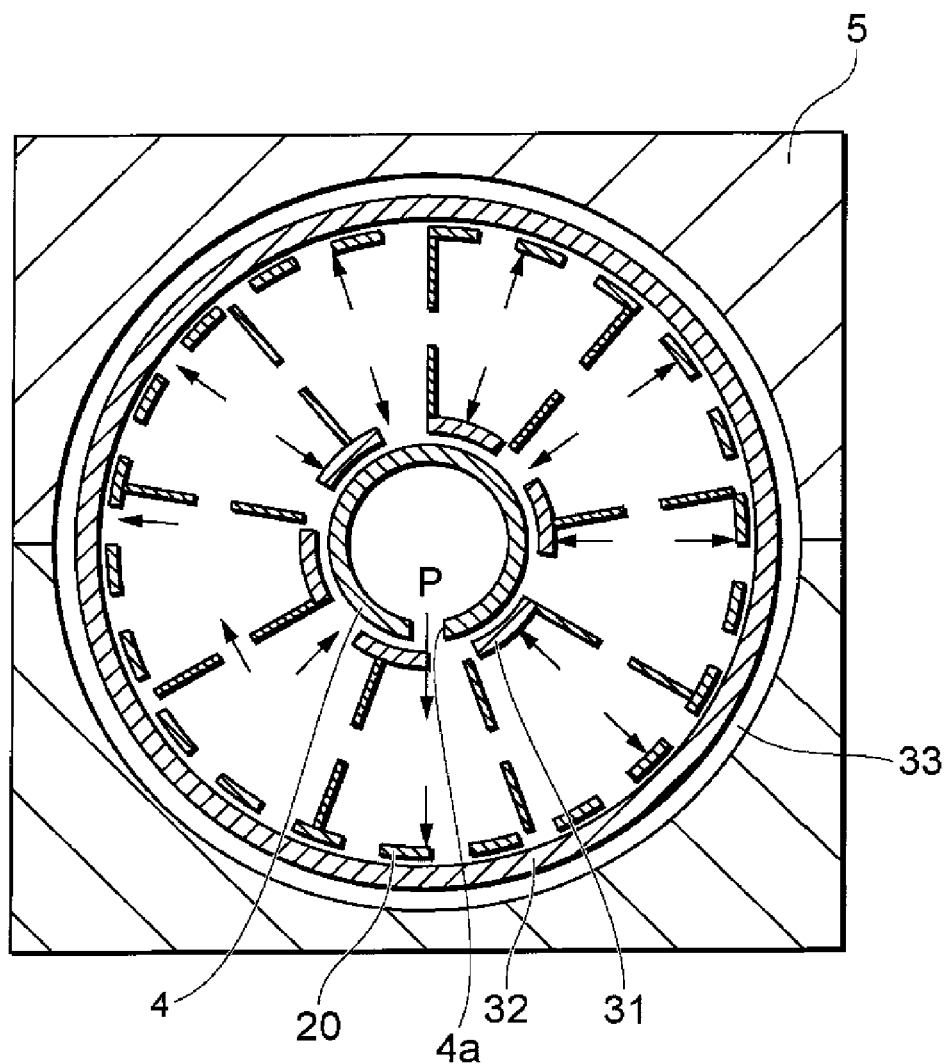
FIG. 7 is a sectional view taken along the line VII-VII of FIG. 6.

After making the macrocell structure 20 and center tube 4, a preliminary structure making step is started. In the preliminary structure making step, a preliminary structure 40 shown in FIGS. 6 and 7 is made. The preliminary structure 40 comprises the macrocell structure 20, center tube 40, and prepregs 31, 32. For making the preliminary structure 40, two to three plies of prepregs 31 are wound about the center tube 4. After winding the prepregs 31, a communication hole similar to the communication hole 4a in the center tube 4 is formed at a position corresponding thereto in the prepregs 31. Subsequently, the center tube 4 wound with the prepregs 31 is inserted into the macrocell structure 20 along the center axis thereof. Then, two to three plies of prepregs 32 are wound about the outer side face of the macrocell structure 20 in ±45° C. directions with respect to the axial direction of the center tube 4. Thus, the preliminary structure 40 is made.

After being made, the preliminary structure 40 is covered with a nylon bag or the like and heated at a temperature of 90° C. to 110° C. under vacuum suction, so as to be cured to a cure depth of about 15%. The cure depth of the preliminary structure 40 is verified by monitoring it in real time according to a dielectric characteristic detected by the IDEX sensor. Since the prepregs 32 wound about the macrocell structure 20 are in contact with only the side wall of the macrocell structure 20, the contact area between the macrocell structure 20 and the prepregs 31, 32 is not so large. This may pose a fear about the adhesion between the macrocell structure 20 and the prepregs 31, 32.

Vacuum suction is carried out when heating the preliminary structure 40 in this embodiment. Therefore, the prepregs 31, 32 can reliably be brought into close contact with and bonded to the macrocell structure 20. This makes it unnecessary to carry out secondary bonding with an adhesive or the like when joining the macrocell structure 20 to the prepregs 31, 32.

Thereafter, a predetermined number of layers of prepregs are further stacked about the preliminary structure 40, so as to form an outer skin 33. Here, the number of layers of prepregs to be stacked and their fiber orientation can be set arbitrarily according to properties required for the resin structure 1 and the like. Then, the preliminary structure 40 covered with the outer skin 33 is placed in a mold 5 which is illustrated by phantom lines in FIG. 6. The mold 5 is formed with a hole communicating with the hollow hole in the center tube 4.

After placing the preliminary structure 40 in the mold 5, a main heat curing step is started. In the main heat curing step, the mold 5 containing the preliminary structure 40 is put into an autoclave. In the autoclave, the atmosphere is kept at 2 to 6 atm (2 atm here), and a pressure P at this atmosphere is applied to the preliminary structure 40 contained in the mold 5. At the same time, the preliminary structure 40 is heated, so as to cure the prepregs in the preliminary structure 40. Here, the prepregs are heated to cure at 90° C. for 1 hr and then 130° C. for 1.5 hr. The heating rate at each temperature is set to 2 to 4° C./min. Thus setting the heating rate can restrain pinholes from occurring. When the preliminary structure 40 is thus heated to cure, the resin structure 1 can be obtained. The macrocell structure 20 in the preliminary structure 40 becomes the inner structure 2 after being cured.

The center tube 4 is formed with the communication hole 4a, while the macrocell structure 20 has a honeycomb form. Therefore, the cells in the macrocell structure 20 and the inside of the prepregs 31, 32 covering them communicate with each other, whereby the pressure P in the autoclave is uniformly exerted. Here, the prepregs 31, 32 have a cure depth held at 15% and thus can inflate in response to the pressure P of the autoclave while keeping airtightness, thereby compressing the center tube 4 and outer skin 33. Since all the cells communicate with each other, the pressures on the outside and inside of the cell wall are in equilibrium even when the pressure P of the autoclave is applied to each cell. Therefore, the cells can be kept from being collapsed.

Figure 8:
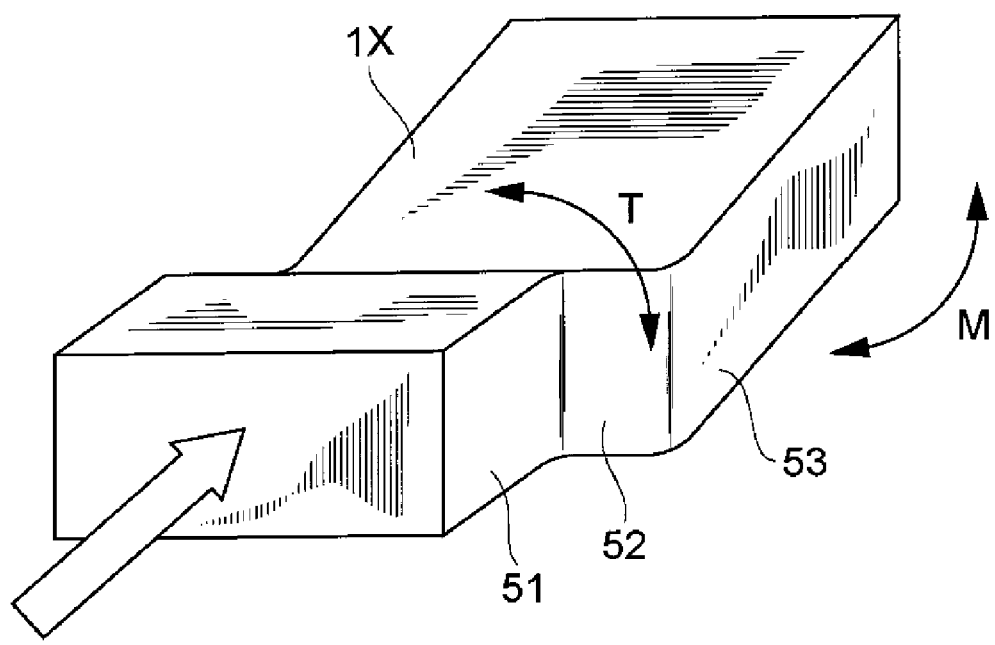
FIG. 8 is a perspective view of another example of resin structure.

Though a preferred embodiment of the present invention is explained in the foregoing, the present invention is not limited thereto. For example, while the spherical resin structure 1 is produced in the above-mentioned embodiment, various forms can be employed without being restricted to the spherical form. While the inner structure 2 is unfolded in a rotary symmetric manner in the above-mentioned embodiment, it may be unfolded along a certain curve when formed as shown in FIG. 8. For example, as shown in FIG. 8, a form having a curve suitable for use as a front member or suspension member in a vehicle may be employed.

Figure 9:
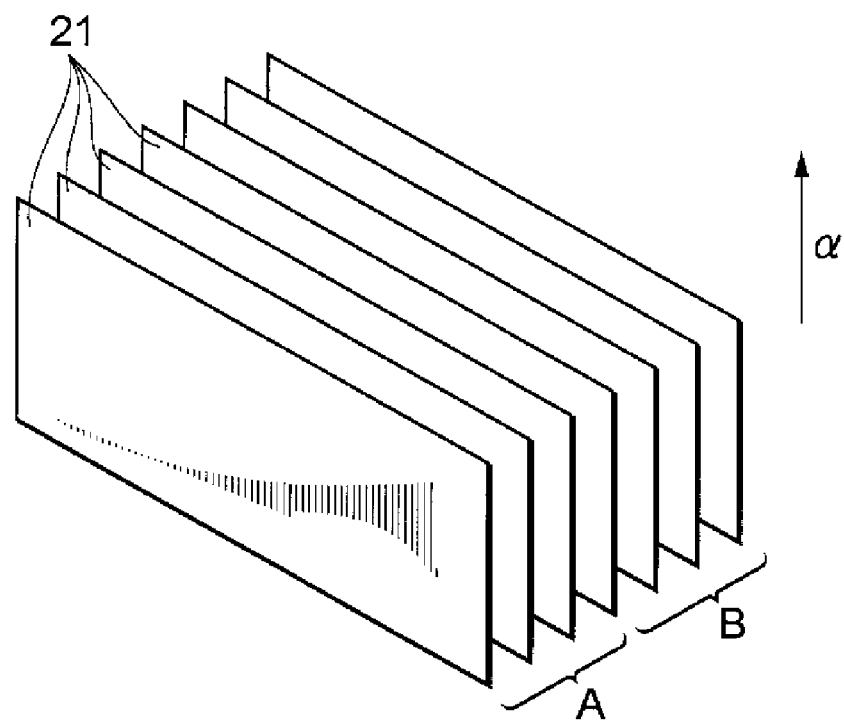
FIG. 9 is a perspective view showing a prepreg multilayer structure used when producing the resin structure shown in FIG. 8.
Figure 10:
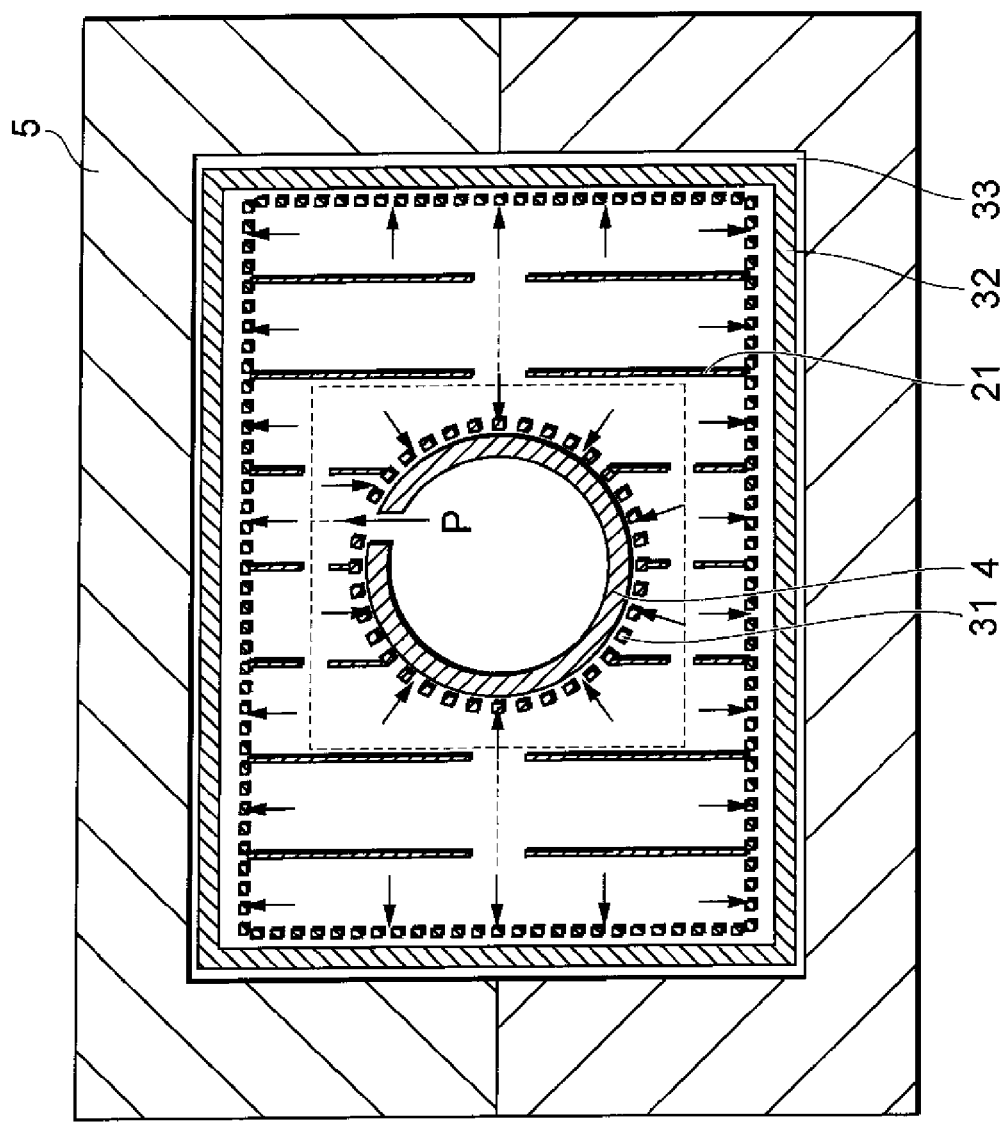
FIG. 10 is a perspective view of a state before curing the resin structure shown in FIG. 8.
Figure 11:
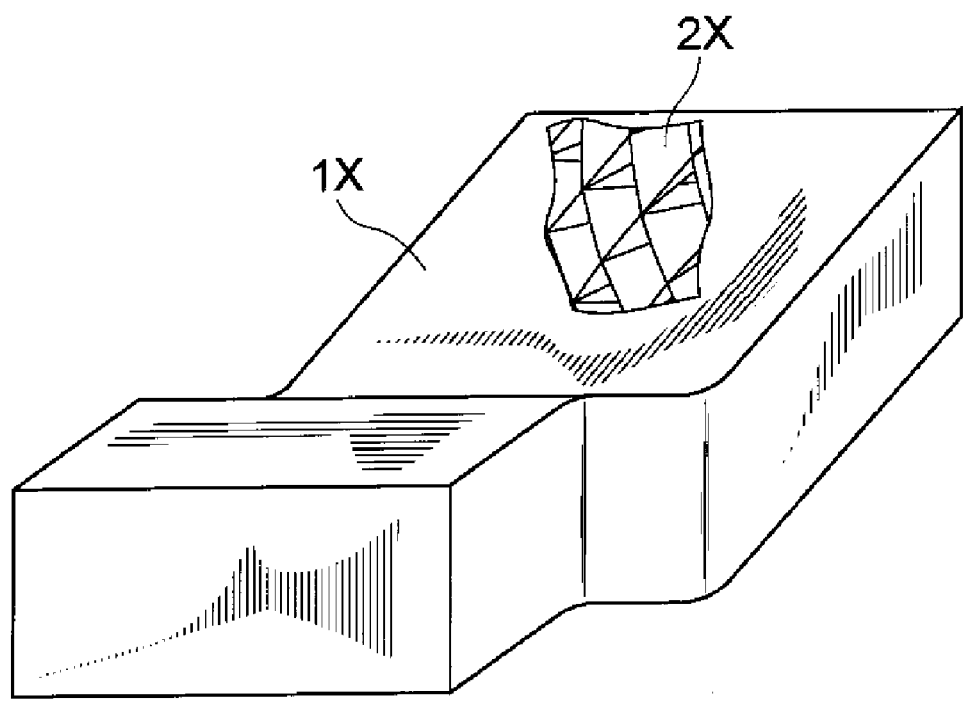
FIG. 11 is a partly broken perspective view of still another example of resin structure.

Thus shaped resin structure 1X has a form in which a front linear part 51 and a rear linear part 52 are arranged on the front and rear sides of FIG. 8, respectively, while a bent part 53 connects the front and rear linear parts 51, 52 to each other. The resin structure 1X is produced by a procedure similar to that of the above-mentioned embodiment, while using a plurality of prepregs 21 stacked as shown in FIG. 9. The resin structure 1X is produced by using a mold 5 shown in FIG. 10. As shown in FIG. 11, an inner structure 2X having a honeycomb form is made on the inside of the resin structure 1X. A center tube 4 is provided at the center position of the laminate formed by stacking the prepregs 21. Prepregs 31, 32 are arranged about the laminate, while an outer skin 33 is provided on the outside thereof.

Preferably, when stacking a plurality of prepregs 21 shown in FIG. 9 at the time of producing such a resin structure 1X, the prepregs 21 arranged in a front-side area A has a fiber orientation of ±45° with respect to an axis α, while the prepregs 21 arranged in a rear-side area B has a fiber orientation of 0°/90° with respect to the axis α. When a load W acts on the front face of the front linear part 51 in thus formed resin structure 1X, a torsion moment T and a bending moment M may become dominant loads. Here, the above-mentioned fiber orientations allow the resin structure 1X to exhibit effective reaction forces against the loads.

Figure 12:
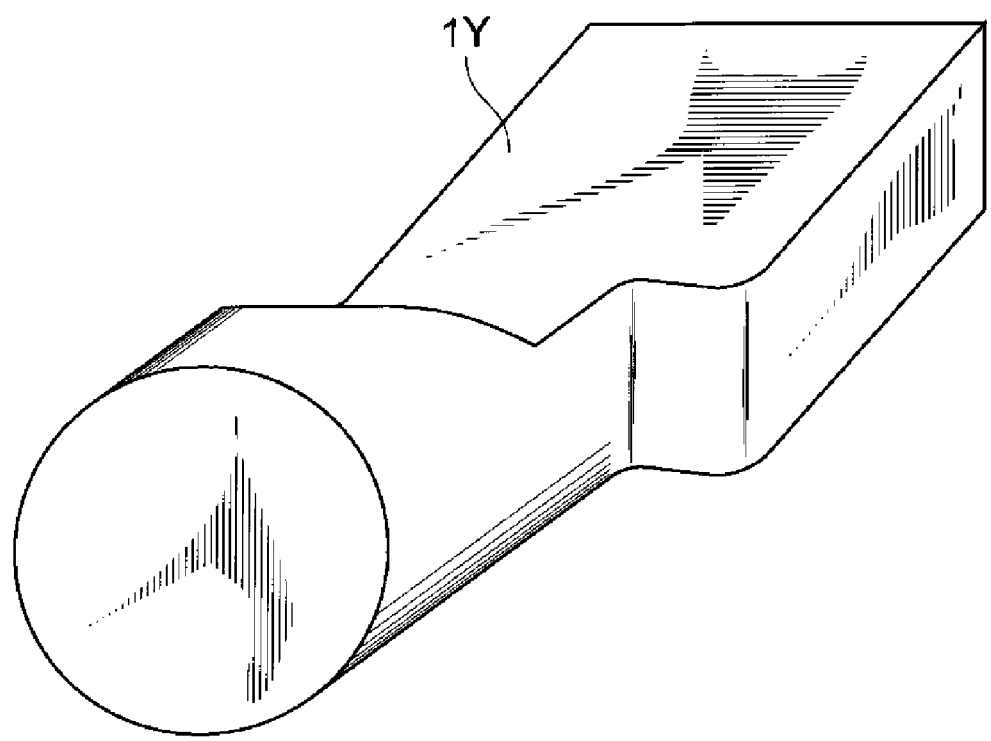
FIG. 12 is a perspective view of still another example of resin structure.
Figure 13:
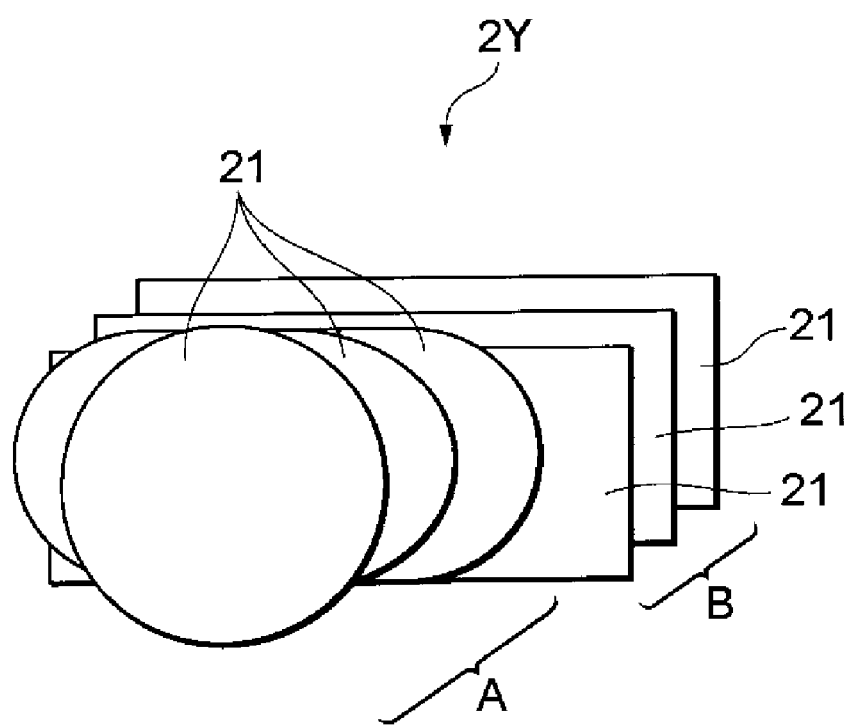
FIG. 13 is a perspective view showing a prepreg laminate used when producing the resin structure shown in FIG. 8.

The front part of the form shown in FIG. 8 may be modified as illustrated in FIG. 12. In the form shown in FIG. 12, the rear linear part 52 has a rectangular cross section, while the front linear part 51 connected thereto through the bent part 53 is shaped such that its cross section approaches a circular form as it shifts from the rear side to the front side. As shown in FIG. 13, an inner structure 2Y used when producing the resin structure 1Y having such a form employs prepregs 21 having a rectangular form as those arranged in the rear-side area B and prepregs 21 whose forms approach a circular form toward the front as those arranged in the front-side area A. Thus, the resin structure 1Y having a complicated form with different cross sections as shown in FIG. 2 can also be produced easily.

Figure 14:
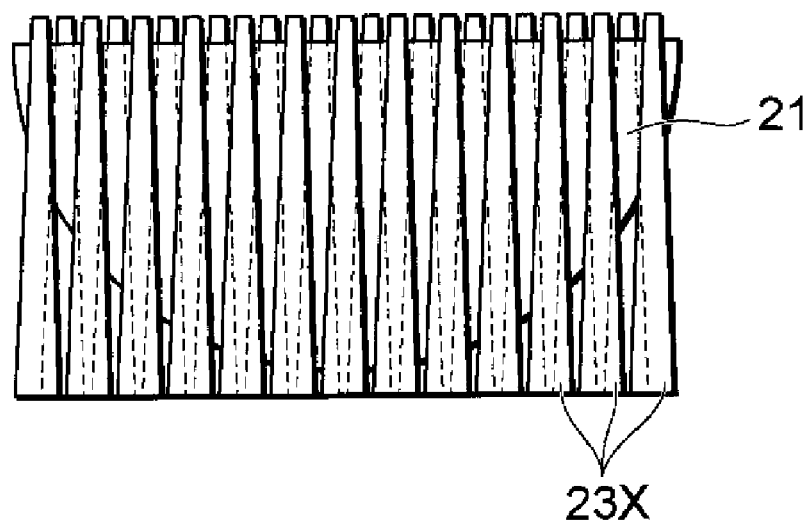
FIG. 14 is a plan view showing another example of Teflon films held in the prepreg laminate.

While the above-mentioned embodiment employs rectangular Teflon films 23 having the same width, those having other forms may be used. For example, as shown in FIG. 14, trapezoidal Teflon films 23X may be used. Using the trapezoidal Teflon films 23X can gradually change the sizes of cells. The macrocell structure made by using the trapezoidal Teflon films 23X increases the width between cells toward its outer periphery, while becoming denser toward its center part. Therefore, in a resin structure produced by using this macrocell structure, the cell wall is likely to buckle in the outer peripheral part, so that the resin structure breaks from the outer periphery in response to the load applied thereto, whereby a correspondingly high energy absorbing capacity can be exhibited.

Figure 15:
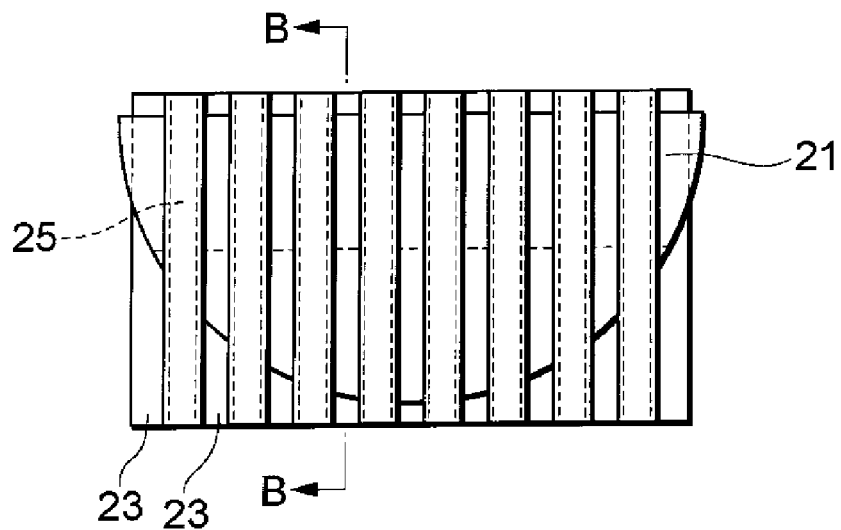
FIG. 15($a$) is a plan view showing still another example of Teflon films held in the prepreg laminate, whereas FIG. 15($b$) is a sectional view taken along the line B-B of FIG. 15($a$).
Figure 15:
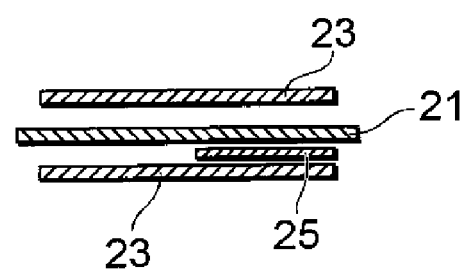

As shown in FIG. 15, a substantially rectangular parallelepiped auxiliary prepreg 25 may be interposed between prepregs 21 in the prepreg laminate at a position on the center side. Interposing such an auxiliary prepreg 25 also makes it easier for the cell wall to buckle at the outer peripheral part in the resin structure, so that the resin structure breaks from the outer periphery in response to the load applied thereto, whereby a correspondingly high energy absorbing capacity can be exhibited.

What is claimed is:

1. A method for producing a resin structure having an inner preform and an outer shell resin member arranged along a side wall of the inner preform, the method comprising:

stacking a plurality of prepregs, linearly bonding prepregs located adjacent to each other in the stacking direction of the plurality of overlapping prepreg layers to each other at a predetermined interval, and unfolding the plurality of prepregs to form a honeycomb inner preform;

a preliminary heat curing step of preheating to cure the inner preform to a cure depth falling within a range where a flexibility of the prepregs constituting the inner preform remains;

a preliminary structure making step of arranging an outer shell resin matrix to become the outer shell resin member along the side wall of the inner preform preheated by the preliminary heating step, so as to make a preliminary structure comprising the inner preform and outer shell resin matrix;

a vacuum suction heating step of heating the preliminary structure made by the preliminary heating step while vacuuming the inside of the outer shell resin matrix in the preliminary structure;

and a main heat curing step of heating the preliminary structure while imparting an internal pressure thereto within a mold after the vacuum suction heating step, so as to cure the preliminary structure.

2. A method for producing a resin structure according to claim 1, wherein the preliminary structure making step attaches a completely cured resin tube to the inner preform, so as to make the preliminary structure in a state where the outside and inside of the preliminary structure communicate with each other; and wherein the main heat curing step imparts the internal pressure to the preliminary structure through the resin tube.

3. A method for producing a resin structure according to claim 1, wherein the main heat curing step imparts the internal pressure to a plurality of spaces formed by the inner preform and outer shell resin member through a communication hole communicating the spaces with each other.

* * * * *